J. PERRY.
APPARATUS FOR MEASURING OUT AND DISCHARGING DOUGH.
No. 35,837. Patented July 8, 1862.
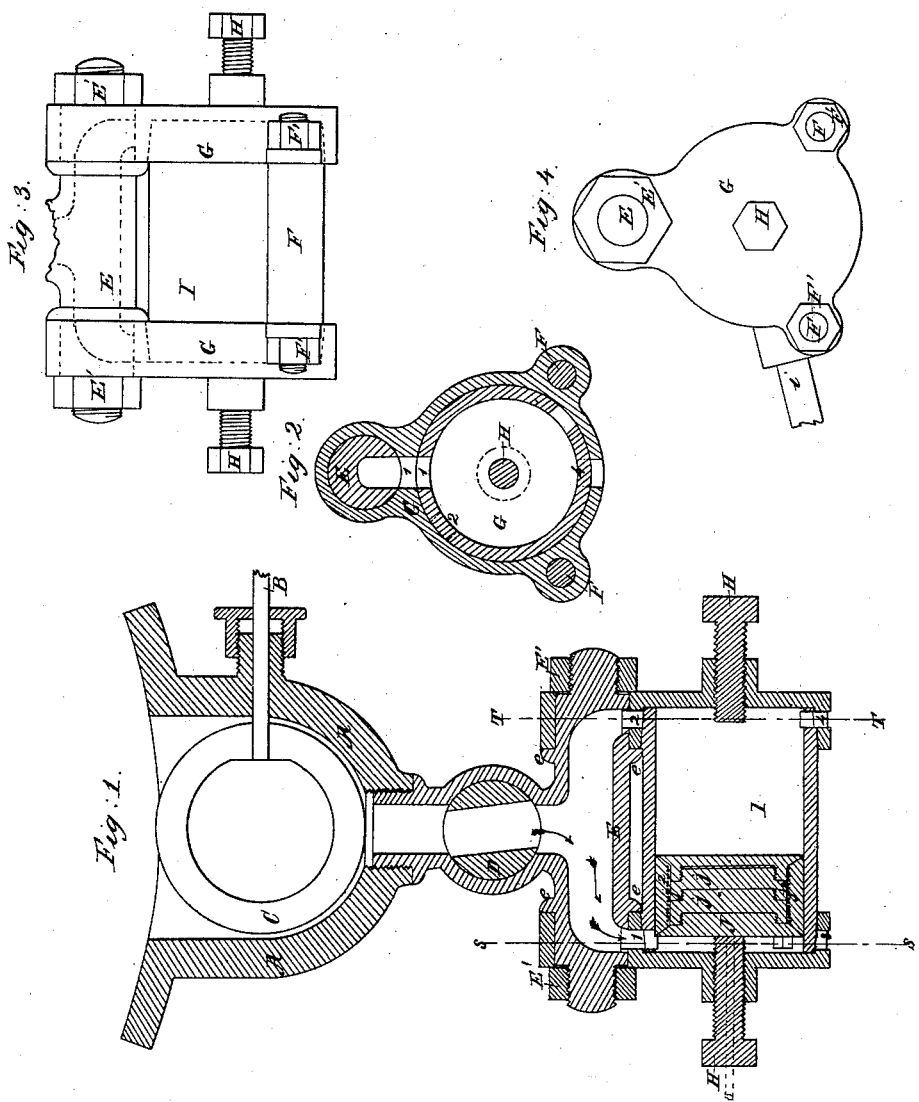

UNITED STATES PATENT OFFICE.

JAMES PERRY, OF BROOKLYN, NEW YORK.

IMPROVED APPARATUS FOR MEASURING OUT AND DISCHARGING DOUGH UNDER PRESSURE.

Specification forming part of Letters Patent No. 35,837, dated July 8, 1862.

*To all whom it may concern:*

Be it known that I, JAMES PERRY, of Brooklyn, in the county of Kings and State of New York, have invented a certain new and Improved Apparatus or Machine for Measuring Out and Discharging Dough Under Pressure; and I do hereby declare that the following is a full and exact description thereof, which has been prepared with a view to the obtaining of Letters Patent therefor, reference being had to the accompanying drawings, which form a part of this specification.

My invention is intended for use in the manufacture of the various kinds of bread, the dough and paste for which are kneaded and prepared under a pressure of gas in a closed vessel. The manner of preparing the dough for what is known as "aerated" bread is an instance of this, showing the necessity for the application of my invention for measuring out and apportioning it into loaves. The dough for aerated bread is kneaded by proper machinery in a strong and tight vessel under such conditions that the pores of the dough are filled with gas at a tension considerably above that of the atmosphere. When the dough or any part thereof is discharged from the kneading-vessel into the atmosphere, the elastic force of the gas within its pores causes it instantly to expand and to give the dough the appearance of being leavened. It is, for obvious reasons, desirable to divide the dough into proper quantities for loaves without handling or delay, and the mode usually adopted is to discharge it through stop-cocks in as nearly as may be the proper quantity for each loaf or roll.

The object of my invention is to accomplish such discharge and apportionment more perfectly than it has heretofore been done. It has not until my invention been possible to make the loaves uniform in size or appearance. The dough has been discharged through a simple stop gate or cock operated by hand, and while the quantity can thus only be approximated to by the skill of the operator, the force with which the elastic and adhesive material issues varies with the pressure of the gas in the kneading-vessel, so that at times it is almost impossible to conduct the operation without causing the dough to be projected with such violence as to form irregularities and great roughness in the finished loaves. The mode of withdrawing the dough directly through stop-cocks also causes a tendency of the dough, in consequence of its peculiar tenacious properties, to sink or draw out so much more rapidly directly over or against the stop-cock than elsewhere as to make a hole or channel leading directly from the free gas in the kneading-vessel to the stop cock, through which the gas escapes and is lost. All these evils are avoided or greatly lessened by my invention, and the dough is discharged quietly, yet rapidly, in uniform quantities, with a necessity for but little skill on the part of the operator.

I use in my apparatus a sub or intermediate kneading-chamber between the main kneading-vessel and the measuring device, and a piston and cylinder arranged and operated in such manner as to measure and discharge the dough received through said intermediate chamber rapidly, correctly, and gently.

In the drawings, Figure 1 represents a longitudinal vertical section through the entire apparatus, showing the intermediate kneading-chamber and a controlling stop-cock not seen in the other figures. Fig. 2 is a section of the cylinder and its attachments on the line S S in Fig. 1, with the addition of red outlines showing the relative position of the ports on the opposite end on the line T T. Fig. 3 is a side elevation of the parts, with the exception of the intermediate kneading-chamber and stop-cock, and Fig. 4 is an end elevation of the same.

Similar letters of reference indicate like parts in all the figures.

A is the sub or intermediate kneading-chamber. It is hemispherical at its base and cylindrical in its upper portion. It opens at the top into the main kneading-vessel and is provided with a flange by which it is bolted thereto. A shaft, B, turned by any suitable power, extends through a stuffing-box in its side and gives motion to a suitable agitator or kneader, C, within, so that the dough passing down through this chamber is worked or kneaded thereby.

D is a stop-cock of ordinary character, designed to stop or control the flow of dough at will.

E is a nearly-cylindrical casting, cored as represented and adapted to receive a nut, E', at each end. It has two flanges or fixed collars, e e, as represented.

F F are bolts, or bolts and thimbles, of a length and thickness adapted to receive a nut, F', at each end.

G G are cylinder ends or castings of a peculiar form, firmly fixed, as represented, to the ends of E F F by the nuts described. Each carries in a suitable boss a stout screw, H.

I is a hollow cylinder tightly fitting within and between the parts G G, but so mounted that it is free to be partly rotated by the handle i. The interior of I is truly bored or perfectly cylindrical throughout, and carries a corresponding piston, J. The exterior of I is tapered or coned slightly at each end, and the parts G G are correspondingly shaped to receive it, making a ground joint therewith. This latter feature makes it easy to compensate by obvious means for the wear of the parts.

Two ports, 1 and 2, are cut in the parts G G at the points represented, directly opposite or against the openings into the interior of E. Two ports, similarly designated 1 and 2, are also cut in the cylinder I at the points represented, respectively, by the black and red lines in Fig. 2, so that by the partial rotation of the cylinder I either can at will be made to coincide with the corresponding opening in G G, but that both cannot thus coincide in whole or in part at the same time. Two ports, 3 and 4, similar to 1 and 2, are also cut in the lower side of G G at the points represented, and ports 3 and 4 are also cut in I, as shown by the red and black lines. It follows from the positions and relation of these respective ports that when the handle i is depressed, so that the cylinder I is turned to its fullest extent in that direction, the ports 1 and 4 in I coincide each with the port similarly designated in G, as represented in the drawings, allowing the dough to move through each. Now, if the handle i is elevated to a mean position, the cylinder I will be turned so far that none of the ports will coincide and no movement of dough can follow; but if it be elevated to its highest position the ports 2 and 3 in I will coincide with the similarly-designated ports in G and allow the dough to move through them. Now, by holding the handle i in its lowest position a little time, the dough will move in the directions indicated by the arrows in Fig. 1, and the piston J will move from left to right till it has completed a stroke. Next, by shifting the handle i to its highest position, the dough will enter and escape at the opposite ends and the piston will make a stroke in the opposite direction. These movements may be repeated indefinitely, and at each stroke a definite quantity of dough will be measured and discharged. The quantity thus discharged may be varied greatly, so that the same cylinder may serve for making five-cent, six-cent, or ten-cent loaves. It may also be varied very slightly, as slightly as may be wished, by different means, so as to allow or compensate for every change in the price of flour. These two changes are made by virtually lengthening and shortening the piston, and by changing the limit within which the piston is allowed to traverse. Both of these changes have the effect to modify the length of the stroke, and thus to vary the quantity of dough discharged; but the facility of accomplishing and the effect of the two means are somewhat different. I can increase and diminish the length of the piston by adding or removing disks or washers j j, which may be introduced at the center or between the ends, as represented, or may be secured on the exterior at one or both ends, and I can evidently add any number of thicknesses of these I choose, or can vary the length by introducing washers of different thicknesses. Another means of obtaining a similar result is to substitute different pistons for each change in length desired; but this involves a greater stock of material than the washers described, and is for this reason less desirable. I can vary the limit within which the piston travels by turning the screws H H so that they shall project more or less into the cylinder. Both these means of adjustment and their effect in varying the amount discharged will be obvious; but the two modes differ. They differ, first, in the difficulty of effecting the adjustment, that by the screws H being the easiest, and, secondly, in their effect on the discharge.

It is desirable, in consequence of the elastic nature of the dough, to have about the amount of clearance (or space between the limit of motion of the piston and the interior of the cylinder end) which is represented in the drawings, or a little more or less, as may be determined under various considerations by experiment, and this, by its softening effect on the discharge, particularly near the end of each discharge, promotes the smoothness of the loaf. It is therefore desirable to make all great changes in the quantity by changing the length of the piston, and only the small changes by moving the stops H H.

Another matter of great importance in discharging dough under very high and variable pressures of gas is the frictional or other resistance to the motion of the piston. If the piston moved without any resistance whatever, the dough would be discharged under high pressure with very great velocity and induce roughness in the loaves and other evils unless the stop-cock D were nearly closed, so as to "throttle" the flow of the dough, and if throttling were carried to such extent as to make it effectual it would induce a premature partial expansion of the dough, which would prevent the measurement of the proper quantity. I secure a varied resistance to the motion of the piston by varying the quantity or condition of the packing in the piston J, and am thus enabled to work at proper speed and with large ports for the discharge of the dough without throttling under all pressures. I prefer to construct and pack my piston in the manner substantially as represented, so that I can vary the compression of the packing endwise by simply turning around one end of the piston or a screw therein. This packing is made of wool or other fibrous material wound around a helix of stout wire, $j^2$, which underlies and supports it. If the pressure of the gas is slight, I reduce the quantity of the packing, or the endwise compression of the same, until it presses but slightly against the interior of the cylinder I; but when the pressure of the gas in the kneading-vessel, and consequently its force in impelling the piston, is greater, I increase the quantity of the packing or increase its endwise compression by turning one part of the piston around upon the other until the friction of the packing against I is sufficient to allow only the proper motion. By these means, to wit, the variable retardation of the motion of the piston and the liberal clearance or space at the end of the cylinder between it and the piston, I am enabled to discharge the dough rapidly, yet with moderate force, and with a smooth and gradual ending of each discharge under all conditions.

In order to provide for operating successfully with very small pressures of gas in making certain kinds of bread, crackers, &c., I can attach a piston-rod to my piston J, as represented by the red lines in Fig. 1, and can aid the motion of the piston by a variable crank or any other suitable mechanism connected to such piston-rod. I can also employ such piston-rod and mechanism to retard the motion of J, when the pressure is too high, by means which will be obvious to every mechanic, as by compressing the packing in the stuffing-box through which the piston-rod plays, or by a friction-break, or by a belt or other connection to a steam-engine or other moderately-moving machine, the motion of which might thus control the movements of the piston; but I do not consider such piston rod and machinery necessary for ordinary purposes, and do not confine myself either to it or any other specific means of making resistance to the motion of the piston.

It is evident that two or more of my discharging cylinders and pistons and any number of ordinary stop-cocks can be connected to the same intermediate chamber A, if desired. A stop-cock can in such case be used alone, either experimentally or continuously, in lieu of a piston and cylinder, with the same general effect as when a stop-cock discharger has been heretofore used, and in such case the intermediate chamber A will perform the same function for the stop-cock discharger as it does for the piston and-cylinder discharger, as described.

Having now fully described my invention, what I claim as new therein, and desire to secure by Letters Patent, is—

1. The employment of a piston and cylinder, in combination with means for varying the extent of the motion, for the purpose of measuring out the exact quantity of dough to form the several-sized loaves and to regulate the flow thereof, substantially as herein set forth.

2. Regulating the force of the discharge of the dough from such cylinder by the application of a greater or less resistance to the motion of the piston, for the purpose herein set forth.

3. The use of an internal cylinder having a partial rotating or equivalent movement, in combination with a piston moving in accordance with the internal pressure in the kneading-machine, for the purpose above specified.

4. The employment of a receptacle interposed between the kneading-vessel and a discharger, so as to promote the effective operation of the latter and to prevent the escape and loss of gas, substantially as herein set forth.

In testimony whereof I have hereunto set my hand in the presence of two subscribing witnesses.

JAMES PERRY.

Witnesses:
  G. H. BABCOCK,
  D. W. STETSON.